(No Model.)

E. W. SNYDER & J. L. BACHMAN.
REAPER AND MOWER.

No. 261,268. Patented July 18, 1882.

Side View of Lever O.

Witnesses:
Samuel P. Kinsey
Frank P. Kinsey

Inventors:
Edwin W. Snyder
Jonas L. Bachman
per Thomas P. Kinsey, Atty

N. PETERS, Photo-Lithographer, Washington, D. C.

UNITED STATES PATENT OFFICE.

EDWIN W. SNYDER, OF GERMANSVILLE, AND JONAS L. BACHMAN, OF STONY RUN, PENNSYLVANIA, ASSIGNORS OF ONE-THIRD TO WILLIAM M. BENNINGER, OF SLATINGTON, PENNSYLVANIA.

REAPER AND MOWER.

SPECIFICATION forming part of Letters Patent No. 261,268, dated July 18, 1882.

Application filed March 27, 1882. (No model.)

*To all whom it may concern:*

Be it known that we, EDWIN W. SNYDER, of Germansville, Lehigh county, State of Pennsylvania, and JONAS L. BACHMAN, of Stony Run, Berks county, Pennsylvania, have invented a new and useful Improvement in Reapers and Mowers, of which the following is a specification.

This improvement is applicable to all makes of mowers or reapers, and is designed to place within the reach of the driver (without rising from his seat) the means of starting the knife-bar before the machine is moved forward.

Figure 1:
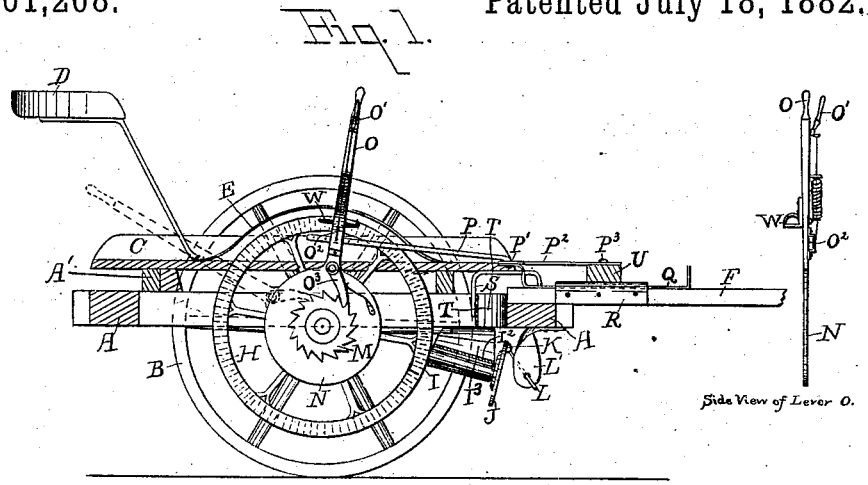
Figure 2:
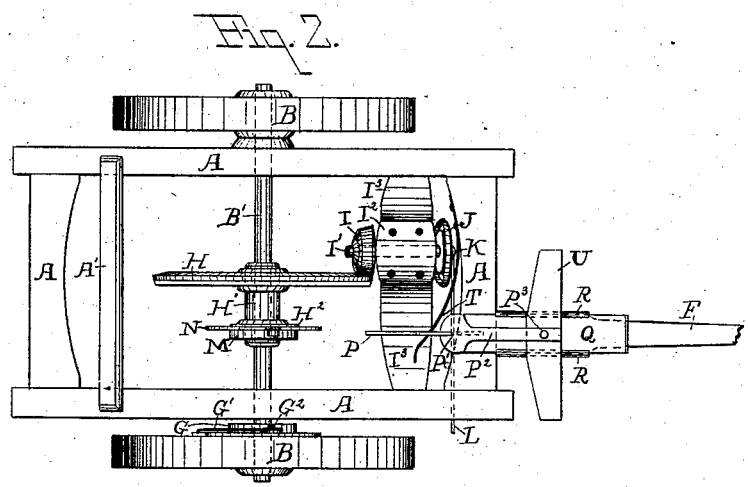
Figure 3:
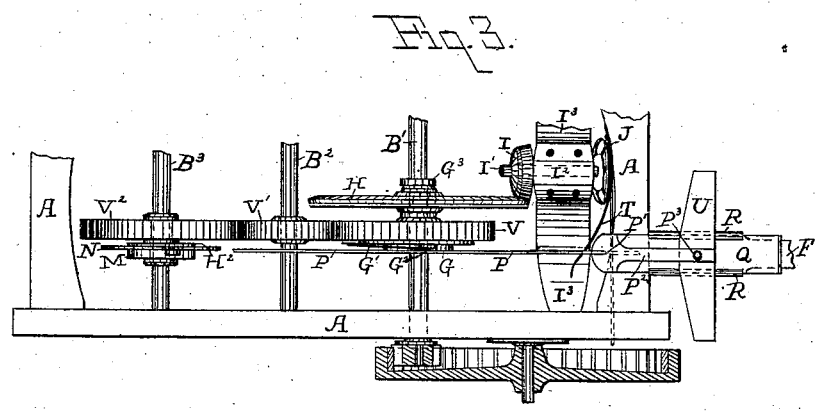

Referring to the drawings herewith, which are a part of this specification, and in which similar parts are marked by letters of corresponding form, Figure 1 is a longitudinal sectional elevation of a mower disclosing our improvement. Fig. 2 is a plan view with the platform, seat, and hand-lever removed to show more clearly the arrangement of parts. Fig. 3 shows the application of the improvement to a fixed-axle machine.

The drawings are only clearly detailed as to our improvements, but are sufficiently clear for the comprehension of an expert or manufacturer of mowers or reapers.

A represents the bed or frame of the machine; A', a supporting-piece for the platform; B, the traction-wheels; B', the axle; C, the platform; D, the driver's seat mounted thereon; E, a guard protecting the driving gear-wheel; F, the tongue or pole of the machine.

G is a ratchet secured to the axle of the machine; G', a spring, and G² a pawl secured to the hub of the wheel B and revolving with it, so arranged that when the draft is forward the pawl is held in the ratchet by the spring, and the revolution of the wheel is thus transferred to the axle and large driving-gear.

H is the large driving gear-wheel, keyed directly to the axle or else upon the sleeve H', common to the gear and ratchet.

I is the small bevel or gear wheel, keyed to the shaft I', which has its bearing in a box, I², supported by the hanger I³, secured to the frame.

J is the crank-wheel, and K the crank-pin, which, by connection with the rod L, transmits the reciprocating movement to the cutter-bar, which is not shown on the drawings, we making no claim to the parts described thus far, they being common to all mowers and reapers, being simply modified to adapt them to the various machines in use.

M represents a ratchet-wheel secured directly to the axle or else upon a sleeve fitted to the axle, said sleeve being either keyed to the axle or by set-screws retained upon the same.

N represents a loose disk clasped between the ratchet M and a collar, H², on the sleeve H', before described.

O represents a hand-lever forming part of the loose disk N or bolted thereon, has a spring-handle, O', hasp O², a dog or pawl, O³, is also pivoted thereto, and dropping into the teeth of the ratchet upon the axle or sleeve.

P is a rod connecting the hand-lever O with the sliding draft-head, and is made adjustable as to movement by a series of pin-holes in the flat end of the bar where it passes through the hasp upon the hand-lever.

P² is a link from the hook-connection of P to the single-tree, and which is retained in place by the pin P³.

Q is the sliding draft-head, bent at right angles and perforated at the front end, at the rear end being first bent vertically at right angles, and then horizontally toward the rear, and perforated for the hook P'.

R R represent the slide within which the head Q reciprocates.

S is the reverse action hook, connected with the sliding head and resting against the rear of the relieving-spring.

T is the relieving spring, secured to the inside of the forward end sill of the frame, and U is the double-tree.

To operate the lever O independent of the hands when in gear, we attach thereto a suspended stirrup, W, into which the foot is inserted, and the lever moved thereby, thus enabling the operator to give a greater sweep to the lever movement, and consequently more reciprocations to the cutter-bar.

The action of the improvement is as follows:

The horses are attached to the double-tree U, as usual, the head Q being drawn back by the spring T, the hand-lever being in the position indicated by the dotted lines, the spring-lever O' being thrown into gear. On the horses starting the sliding head will be drawn forward, and, by the connections P³, P², P', and P with the lever O and pawl O³, operating upon the ratchet M and axle B' or sleeve H', sets in motion the driver H, in gear with I, and, according to the pull of the sliding head or sweep of the lever O, gives one or more revolutions to the shaft I' and crank-pin K on disk J, and by connecting-rod L transmits two or more reciprocating movements to the cutter-bar of the machine, and practically clears the way for the further progress thereof.

Should the driver be desirous of clearing the way before starting the horses, or of clearing the knives while operating, or of assisting the operation while in the act of turning the machine, he throws the lever O out of gear with the sliding head, and by moving the lever the cutter-bar is operated as before described, while in rounding a curve the additional reciprocations which may be given the cutter-bar will materially assist the horses and prevent clogging of the machine.

We have given this arrangement a thorough test in the field, and in every instance established its practical value.

The relieving-spring T gives ease to the working of the machine, and causes a cessation of the jerking and annoying short stops which appeared heretofore to be inseparably connected with the operation of a mower or reaper.

In Fig. 3 we show the transference of the hand apparatus to a counter-shaft. This adapts the improvement to a machine with fixed axles and traction-wheels revolving therewith, whereas, as shown in Figs. 1 and 2, it is applied to a machine having both wheels loose on the axle.

The wheel for driving the axle during the forward movement of the machine being connected therewith in a positive manner by the ratchet G and a spring, G', operating upon a pawl, G², locked with the teeth of the same, reversing the movement or backing the machine releases the ratchet and the gearing, and therefore the cutter-bar ceases to reciprocate until the forward movement is again resumed. After the machine has started and is in operation the pin-connection between the connecting-rod P and the hand-lever O is released. By pressing upon the spring-handle O' the lever O is then thrown rearward within easy reach of the driver. While in this position the flat end of the connecting-rod P is still retained within the hasp O², ready for instant connection in case of need.

To adapt our improvement to reapers or mowers whose cutter-bars derive their motion from an internal gear-wheel attached to the traction-wheel, the traction-wheel revolving upon fixed axles or pins, and for the purpose of not changing the mode of operating the hand-lever by the driver, or the effect of the draft on the same in the starting up of the machine, we place upon the main shaft the sleeve H², which is free to revolve thereon, and is retained in place by the ratchet G at one end and a collar, G³, at the other end, and, removing the large driver H, we rebore and fit it to the sleeve H², together with a spur-wheel, V. The ratchet G is keyed to the main shaft and revolves with it. The pawl G² is kept in contact with the teeth of the ratchet by a spring, G', and are both attached to the wheel V.

As the driver of the main shaft pinion is an internal gear, the shaft will revolve in the same direction as the traction-wheel. To continue this movement through the sliding head and connecting-rods by direct action upon the lever O, as already described, we introduce an independent counter-shaft, B³, in the rear, upon which we mount the spur-wheel V² and the ratchet M, dog O², levers O O', and loose disk N. If now the wheels V and V² were placed in gear and the draft connected with the lever O, it would cause a reverse movement of the driving-wheel H. To correct this we introduce a second or intermediate shaft, B², upon which is placed the idler-wheel V', and then, having V, V', and V² all in contact or gear, the throwing of the lever O forward by the driver, or the drawing forward of the same by the draft of the horses upon the sliding head Q and connections P P², will operate the wheel H in the proper direction, and thus keep the original movement of the machine unimpaired.

Having set forth our improvement and what we have and propose to accomplish therewith, we desire to secure by Letters Patent the following claims:

1. As an attachment to a mower or reaper, a hand operating device consisting of the following elements: a ratchet, M, loose disk N, lever O, spring-lever O', hasp O², dog or pawl O³, sleeve H', and collar H², in combination with the usual cutter-bar-operating gear, whereby the driver seated upon the machine is enabled to reciprocate the cutter-bar in advance of any forward movement of the machine, in the manner substantially as shown and described.

2. The sliding head Q, in combination with the slide R, double-tree U, hook S, relieving-spring T, connecting-rods P² P, pins P³ P', hand-lever O, with spring-lever O', dog O³, ratchet M, loose disk N, axle B', and the usual cutter-bar-operating gear, whereby the draft of the horses will first be exerted upon the spring T, and the rods P P², drawing forward the lever O, as described, will reciprocate the cutter-bar in advance of the forward movement of the machine, substantially as and for the purpose set forth.

3. In a mowing or reaping machine, the relieving-spring T, connected with the frame A, in combination with the sliding head Q, slides R, and double-tree U, whereby all the shocks and jars incident to the starting up or the draft of the machine while operating in the field are relieved, cushioned, and absorbed, substantially as described.

4. The combination of the lever O, provided with a stirrup, W, dog O³, ratchet M, axle B', sleeve H', gears H and I, shaft I', crank K, and pitman L, whereby the operator with his foot may reciprocate the knife-bar in advance of the forward movement of the machine, substantially as and for the purpose set forth.

EDWIN W. SNYDER.
JONAS L. BACHMAN.

Witnesses:
　DAVID A. MILLER,
　SAML. J. KISTLER.